US012800560B2

(12) United States Patent
Rosi et al.

(10) Patent No.: US 12,800,560 B2
(45) Date of Patent: Nov. 17, 2026

(54) LANTHANIDE COMPOUNDS FOR LUMINESCENCE "TURN-ON" DETECTION

(71) Applicant: UNIVERSITY OF PITTSBURGH—OF THE COMMONWEALTH SYSTEM OF HIGHER EDUCATION, Pittsburgh, PA (US)

(72) Inventors: Nathaniel L. Rosi, Pittsburgh, PA (US); Tianyi Luo, Baltimore, MD (US); Prasenjit Das, Pittsburgh, PA (US)

(73) Assignee: UNIVERSITY OF PITTSBURGH—OF THE COMMONWEALTH SYSTEM OF HIGHER EDUCATION, Pittsburgh, PA (US)

( * ) Notice: Subject to any disclaimer, the term of this patent is extended or adjusted under 35 U.S.C. 154(b) by 976 days.

(21) Appl. No.: 17/781,402

(22) PCT Filed: Dec. 14, 2020

(86) PCT No.: PCT/US2020/064812

§ 371 (c)(1),
(2) Date: Jun. 1, 2022

(87) PCT Pub. No.: WO2021/119583

PCT Pub. Date: Jun. 17, 2021

(65) Prior Publication Data

US 2023/0011770 A1 Jan. 12, 2023

Related U.S. Application Data

(60) Provisional application No. 62/947,603, filed on Dec. 13, 2019.

(51) Int. Cl.

| | |
|---|---|
| ***B01L 3/00*** | (2006.01) |
| ***B01D 15/08*** | (2006.01) |
| ***B01F 33/302*** | (2022.01) |
| ***B01F 33/3033*** | (2022.01) |
| ***B01J 8/00*** | (2006.01) |
| ***B01J 8/02*** | (2006.01) |
| ***B01J 20/285*** | (2006.01) |
| ***B01J 20/287*** | (2006.01) |
| ***B01J 20/32*** | (2006.01) |
| ***B01L 7/00*** | (2006.01) |
| ***B01L 9/00*** | (2006.01) |
| ***B65G 47/80*** | (2006.01) |
| ***B82Y 20/00*** | (2011.01) |
| ***B82Y 30/00*** | (2011.01) |
| ***B82Y 40/00*** | (2011.01) |
| ***C07F 7/00*** | (2006.01) |
| ***C08L 5/08*** | (2006.01) |
| ***C09K 11/06*** | (2006.01) |
| ***C12M 1/34*** | (2006.01) |
| ***C12M 3/06*** | (2006.01) |
| ***C12N 1/14*** | (2026.01) |
| ***C12N 1/20*** | (2026.01) |
| ***C12Q 1/02*** | (2006.01) |
| ***C12Q 1/6806*** | (2018.01) |
| ***C12Q 1/6844*** | (2018.01) |
| ***C12Q 1/6848*** | (2018.01) |
| ***C12Q 1/6851*** | (2018.01) |
| ***C12Q 1/686*** | (2018.01) |
| ***G01K 1/14*** | (2021.01) |
| ***G01N 1/44*** | (2006.01) |
| ***G01N 15/10*** | (2024.01) |
| ***G01N 15/14*** | (2024.01) |

(Continued)

(52) U.S. Cl.
CPC ............... *G01N 31/22* (2013.01); *C07F 7/00* (2013.01); *C09K 11/06* (2013.01); *G01N 21/6428* (2013.01); *C09K 2211/182* (2013.01); *G01N 2021/6439* (2013.01)

(58) Field of Classification Search
CPC ............... G01N 31/22; G01N 21/6428; G01N 2021/6439; G01N 21/77; G01N 2021/7786; C07F 7/00; C09K 11/06; C09K 2211/182

See application file for complete search history.

(56) References Cited

U.S. PATENT DOCUMENTS

| | | | | |
|---|---|---|---|---|
| 6,406,297 | B1 | 6/2002 | Raymond et al. | |
| 2006/0292664 | A1* | 12/2006 | Ponce | C12Q 1/22 382/128 |
| 2011/0111388 | A1 | 5/2011 | Hennig et al. | |
| 2018/0149599 | A1 | 5/2018 | Humphrey | |

FOREIGN PATENT DOCUMENTS

| | | | | |
|---|---|---|---|---|
| CN | 106497549 A * | 3/2017 | | C09K 11/06 |
| WO | 2016063304 A1 | 10/2015 | | |

OTHER PUBLICATIONS

D'Vries, Richard F., et al. "Luminescence, chemical sensing and mechanical properties of crystalline materials based on lanthanide-sulfonate coordination polymers." RSC Advances 6.111 (2016): 110171-110181. (Year: 2016).*

Wang, Yi, et al. "A novel lanthanide MOF thin film: The highly performance self-calibrating luminescent sensor for detecting formaldehyde as an illegal preservative in aquatic product." Sensors and Actuators B: Chemical 251 (2017): 667-673. (Year: 2017).*

Foucault-Collet, Alexandra, et al. "Lanthanide near infrared imaging in living cells with Yb3+ nano metal organic frameworks." Proceedings of the National Academy of Sciences 110.43 (2013): 17199-17204. (Year: 2013).*

(Continued)

*Primary Examiner* — Oyeleye Alexander Alabi

(74) *Attorney, Agent, or Firm* — Carol A. Marmo; Eckert Seamans Cherin & Mellott, LLC

(57) ABSTRACT

The invention relates to luminescence-based compounds, compositions and methods for chemical sensing in solid state and solutions. More particularly, the invention includes "turn-on" lanthanide sensors that luminesce only in the presence of an organic compound (analyte) and are non-emissive in the absence of the organic compound (analyte).

6 Claims, No Drawings

(51) Int. Cl.

| | |
|---|---|
| ***G01N 15/1433*** | (2024.01) |
| ***G01N 21/01*** | (2006.01) |
| ***G01N 21/03*** | (2006.01) |
| ***G01N 21/05*** | (2006.01) |
| ***G01N 21/29*** | (2006.01) |
| ***G01N 21/33*** | (2006.01) |
| ***G01N 21/35*** | (2014.01) |
| ***G01N 21/59*** | (2006.01) |
| ***G01N 21/64*** | (2006.01) |
| ***G01N 21/65*** | (2006.01) |
| ***G01N 21/75*** | (2006.01) |
| ***G01N 21/77*** | (2006.01) |
| ***G01N 27/07*** | (2006.01) |
| ***G01N 27/28*** | (2006.01) |
| ***G01N 27/416*** | (2006.01) |
| ***G01N 30/02*** | (2006.01) |
| ***G01N 30/60*** | (2006.01) |
| ***G01N 30/72*** | (2006.01) |
| ***G01N 31/10*** | (2006.01) |
| ***G01N 31/12*** | (2006.01) |
| ***G01N 31/22*** | (2006.01) |
| ***G01N 33/543*** | (2006.01) |
| ***G01N 33/557*** | (2006.01) |
| ***G01N 33/564*** | (2006.01) |
| ***G01N 33/574*** | (2006.01) |
| ***G01N 33/575*** | (2026.01) |
| ***G01N 33/57515*** | (2026.01) |
| ***G01N 33/58*** | (2006.01) |
| ***G01N 33/68*** | (2006.01) |
| ***G01N 33/72*** | (2006.01) |
| ***G01N 35/00*** | (2006.01) |
| ***G01N 35/02*** | (2006.01) |
| ***H05B 45/10*** | (2020.01) |
| ***H10W 90/00*** | (2026.01) |

(56) References Cited

OTHER PUBLICATIONS

Batterman, Stuart, et al. “Sources, concentrations, and risks of naphthalene in indoor and outdoor air.” Indoor air 22.4 (2012): 266-278. (Year: 2012).*

International Search Report and Written Opinion Issued in PCT/US2020/064812 Dated May 28, 2021.

* cited by examiner

LANTHANIDE COMPOUNDS FOR LUMINESCENCE "TURN-ON" DETECTION

CROSS-REFERENCE TO RELATED APPLICATION

This patent application is a U.S. National Stage Application under 35 U.S.C. § 371 of International Patent Application No. PCT/US2020/064812, filed on Dec. 14, 2020, entitled "LANTHANIDE COMPOUNDS FOR LUMINESCENCE "TURN-ON" DETECTION", which claims the benefit of priority of U.S. Provisional Patent Application No. 62/947,603, entitled "LANTHANIDE COMPOUNDS FOR LUMINESCENCE "TURN-ON" DETECTION OF GOSSYPOL", filed on Dec. 13, 2019, the contents of which are incorporated herein by reference.

GOVERNMENT FUNDING

This invention was made with government support under HDTRA1-16-1-0044 awarded by the Department of Defense. The government has certain rights in the invention.

FIELD OF THE INVENTION

The invention relates to luminescence-based compounds and methods as "turn-on" sensors that luminesce only in the presence of analyte and are non-emissive in the absence of analyte and, more particularly, lanthanide compounds, such as metal-organic frameworks (MOFs), complexes, and simple salts, that provide chemical sensing of analyte in both solid state and solution.

BACKGROUND OF THE INVENTION

Luminescence-based methods are highly attractive for chemical sensing and offer several potential advantages, such as low limit of detection, high sensitivity, and fast response. Particularly desirable, yet still challenging to achieve, are "turn-on" sensors that luminesce only in the presence of analyte and are non-emissive in the absence of analyte.

Traditionally, ultraviolet (UV) spectrophotometry methods have been extensively studied and broadly used for the detection and quantification of various analytes. These methods, however, are nonspecific and can be easily interfered by light absorption of impurities. To improve selectivity for analyte detection, UV spectrophotometry are often coupled with high-performance liquid chromatograph (HPLC).

"Turn-on" sensing mechanisms, though under-tapped for lanthanide (Ln) compounds, are especially attractive. Since the 4f-4f electron transitions associated with $Ln^{3+}$ photoluminescence (PL) are Laporte forbidden, direct excitation of $Ln^{3+}$ of electron transitions is prohibitively inefficient. The excitation of $Ln^{3+}$ PL is typically achieved via the "antenna effect", a sensitization process in which chromophore molecules with large molar absorption coefficients harvest light and transfer energy to excite 4f electrons of the nearby $Ln^{3+}$ center. Leveraging the "antenna" effect, luminescence "turn-on" sensing with high specificity is possible for analytes that can either 1) directly function as an antenna, or 2) effectively modulate the sensitization of the integral sensitizer, such that with a properly selected excitation wavelength, $Ln^{3+}$ PL is off in the absence of the analyte and switched on only in the presence of the analyte. Despite the pressing need for facile methods to detect a large variety of organic compounds, including pharmaceutical contaminants, industrial chemicals, polycyclic aromatic hydrocarbons, biomarkers, and naturally occurring toxins, and the fact that many of these target analytes are aromatic chromophores that could be effective sensitizers for $Ln^{3+}$ PL, $Ln^{3+}$-based luminescence "turn-on" sensors have seldom been explored for sensing organic molecules, with few successful examples.

Gossypol is a natural toxin concentrated in cotton-seeds that poses great risks to the safe consumption of cotton-seed products. A series of detrimental effects of gossypol have been observed in humans and animals, including acute poisoning, hepatoxicity, infertility and immunotoxicity. Facile, and sensitive detection methods for gossypol are necessary to ensure that the concentration of gossypol is at a safe level in various cotton-seed products, such a cotton-seed oil and animal feed materials. The Chinese Ministry of Health requires that concentration of free gossypol in edible cotton-seed oil should not exceed 200 ppm. The maximum free gossypol concentrations permitted by the European Union for various animal feed materials and complete feeding stuffs range from 20 ppm to 5000 ppm.

Additionally there is a large class of chemical contaminants, polycyclic aromatic hydrocarbons (PAHs), that are known as cancer-causing agents and created from incomplete combustion or pyrolysis of organic materials (found in air, soil and aquatic system) and household sources (cooking at high temperature and tobacco smoking). The human body easily bioaccumulates PAHs by these processes that can create serious health threats such as mutagenicity, genotoxicity and teratogenicity. According to the Agency for Toxic Substances and Disease Registry, PAHs were the ninth-most threatening chemical compounds to human health in 2015 and its intoxication is of real importance. Urinary metabolites of PAHs, i.e., 1-hydroxypyrene (OH-Py) and 1-hydroxypyrene-glucuronide (Oglu-Py), are detectable and therefore, devised as reliable biomarkers of human or total PAHs. Pyrene is a major component in PAHs mixture which involves the formation of metabolite OH-Py and its glucuronic acid form Oglu-Py are excreted in urine.

There is a need for "turn-on" sensors, in contrast to luminescence "turn-off" sensors where the presence of analyte attenuates an existing luminescence intensity, that have significantly less luminescence background and therefore, are potentially more sensitive and reliable. It is highly significant to develop a simple, sensitive and selective pathway to identify the presence of a variety of organic compounds (analytes), including pharmaceutical contaminants, industrial chemicals, polycyclic aromatic hydrocarbons, biomarkers, and naturally occurring toxins, such as gossypol and PAH.

SUMMARY OF THE INVENTION

In one aspect, the invention provides a lanthanide-based, turn-on sensor including an organic analyte, and a lanthanide compound that luminesces in the presence of the organic analyte and does not luminesce in the absence of the organic analyte, wherein the lanthanide-based, turn-on sensor is selected from the group consisting of a solid state, solution, suspension, and coating.

The organic analyte can include a pharmaceutical contaminant, an industrial chemical, a biomarker, and a naturally occurring toxin. In certain embodiments, the organic analyte is selected from the group consisting of gossypol and polycyclic aromatic hydrocarbons.

The lanthanide compound may include a chemical element selected from the group consisting of lanthanum, cerium, praseodymium, neodymium, promethium, samarium, europium, gadolinium, terbium, dysprosium, holmium, erbium, thulium, ytterbium, lutetium, and chemically similar elements scandium and yttrium, and combinations thereof.

The lanthanide-based, turn-on sensor may be in various forms selected from metal-organic frameworks, complexes, and simple salts. In certain embodiments, the lanthanide-based, turn-on sensor may be in the form of a thin film.

In certain embodiments, the lanthanide compound is selected from the group consisting of Ln-$NH_2$-TPDC, Ln-$NO_2$-TPDC, Ln-$NH_2$-BDC and Ln-2$NH_2$-BDC wherein Ln represents a lanthanide element, and $LnX_3$, where Ln represents $Ln^{3+}$ cations and X represents an anion. In certain embodiments, $LnX_3$ is selected from the group consisting of $YbCl_3$ and $NdCl_3$.

In certain embodiments, the lanthanide compound is selected from the group of metal-organic frameworks consisting of Yb—$NH_2$-TPDC, Yb—$NO_2$-TPDC, Nd—$NH_2$-TPDC, Nd—$NO_2$-TPDC, Tb—$NH_2$-BDC and Tb-2$NH_2$-BDC, and the metal salt solutions consisting of $YbCl_3.6H_2O$ and $NdCl_3.6H_2O$.

In another aspect, the invention provides a method of selectively sensing or detecting an organic analyte. The method includes preparing a lanthanide-based, turn-on sensor that includes providing a sample material; and providing a lanthanide compound that luminesces in the presence of the organic analyte and does not luminesce in the absence of the organic analyte; interacting the sample material and the lanthanide compound; and determining a presence or absence of luminescence, wherein the presence of luminescence is indicative of a presence of the organic analyte in the sample material interacting with the lanthanide compound and the absence of luminescence is indicative of an absence of the organic analyte in the sample material, and wherein the lanthanide-based, turn-on sensor is selected from the group consisting of a solid state, solution, coating and suspension.

The providing a lanthanide compound step may include reacting $H_2$—$NH_2$-TPDC solution and $LnCl_3$-$6H_2O$, wherein Ln represents a lanthanide element or Ln represents Yb or Nd.

The providing a lanthanide compound step may include reacting $H_2$—$NO_2$-TPDC solution and $LnCl_3$-$6H_2O$, wherein Ln represents a lanthanide element, or Ln represents Yb or Nd.

The providing a lanthanide compound step may include reacting $H_2$—$NH_2$-BDC solution and $LnCl_3$-$6H_2O$, wherein Ln represents a lanthanide element or Ln represents Tb.

The providing a lanthanide compound step may include reacting $H_2$-2$NH_2$-BDC solution and $LnCl_3$-$6H_2O$, wherein Ln represents a lanthanide element or Ln represents Tb.

The providing a lanthanide compound step may include forming a $LnCl_3$ solution, wherein Ln represents a lanthanide element or Ln represents Yb or Nd.

In certain embodiments, the organic compound is gossypol in cotton-seed or other cotton material. In another embodiment, the organic compound is polycyclic aromatic hydrocarbons in a urine sample of a patient.

In another aspect, the invention provides a gossypol sensor that includes the aforementioned luminescence-based, turn-on sensor.

In another aspect, the invention provides a polycyclic aromatic hydrocarbon sensor that includes the aforementioned luminescence-based, turn-on sensor.

DETAILED DESCRIPTION OF THE INVENTION

The invention relates to luminescence-based elements, compounds, compositions and methods for selectively, chemical sensing or detecting organic compounds (analytes). The invention includes lanthanide-based, "turn-on" sensors that luminesce only in the presence of the organic compound (analyte) and are non-emissive in the absence of the organic compound (analyte). The lanthanide-based, turn-on sensors are in various forms or configurations, such as, but not limited to solid state, solution, suspension, coating, e.g., thin film. The turn-on sensor is useful for sensing or detecting a variety of organic compounds, such as, but not limited to, pharmaceutical contaminants, industrial chemicals, polycyclic aromatic hydrocarbons, biomarkers, and naturally occurring toxins.

In certain embodiments, the organic compound is gossypol (Gsp) having the chemical structure I:

I

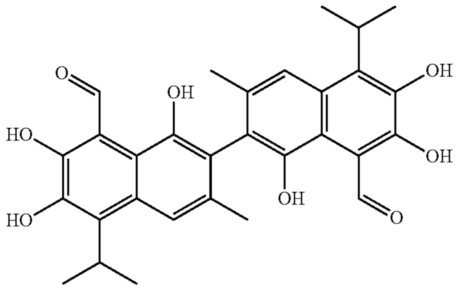

In certain other embodiments, the organic compound is selected from one or more polycyclic aromatic hydrocarbons (PAHs).

The luminescence-based compounds include lanthanide ($Ln^{3+}$) compounds. As used herein and in the claims, the term "lanthanide compound(s)" and related terms refer to various substances containing a chemical element from the series of chemical elements that comprise the fifteen metallic chemical elements with atomic numbers 57-71 (in the Periodic Table of Elements), from lanthanum through lutetium, i.e., lanthanum, cerium, praseodymium, neodymium, promethium, samarium, europium, gadolinium, terbium, dysprosium, holmium, erbium, thulium, ytterbium, lutetium, along with the chemically similar elements scandium and yttrium, (which are often collectively known as the rare earth elements), and combinations thereof.

The luminescence "turn-on" sensors are distinguishable from known luminescence "turn-off" sensors. For the "turn-off" sensors, the presence of analyte attenuates an existing luminescence intensity. The "turn-on" sensors have significantly less luminescence background and therefore, are potentially more sensitive and reliable than the "turn-off" sensors.

Luminescence-based methods, in general, are highly attractive for chemical sensing and exhibit advantages such as low limit of detection, high sensitivity, and fast response. An unusual and highly desirable feature of the luminescence "turn-on" sensors is that they are non-emissive in the absence of the analyte (organic compound), and only luminesce in the presence of the analyte (organic compound). Since the "turn-on" sensors have no background fluorescence, they have the advantage of being more sensitive and reliable than the alternative "turn-off" sensors, wherein the presence of analyte attenuates an existing luminescence intensity.

Another desirable feature of the "turn on" sensors according to the invention is that they are lanthanide-based sensors that are either insoluble, porous, solid-state materials or soluble lanthanide salts. This allows the "turn on" sensing devices to be fabricated in various, different configurations, such as metal-organic frameworks (MOFs), suspensions, coatings, thin films or solutions, as needed. A broad scope of lanthanide compounds, including MOFs, lanthanide complexes, and lanthanide salts, achieve optimized sensing performance, offering another degree of freedom for sensor optimization.

According to the invention, the luminescence "turn-on" sensors for the organic compounds use near infrared emitting lanthanide (Ln)-based materials including Ln MOFs and Ln salts. The photoluminescence of the Ln-based materials, selectively detect the organic compound (analyte) via a "turn-on" response from a completely non-emissive state in the absence of the organic compound. Common background substances that are present in practical samples of the organic compound do not interfere with the Ln photoluminescence signal. Further, the "turn-on" of the photoluminescence of the Ln-based materials is due to the "antenna" effect of the organic compound (analyte). Thus, the organic compound effectively sensitizes Ln photoluminescence. This sensing mechanism provides a facile, highly sensitive, fast-response detection of the organic compound (analyte). Thus, lanthanide-based materials serve as luminescent sensors for detection of a variety of organic compounds, such as, but not limited to, gossypol and a variety of PAHs.

The Ln-based materials according to the invention include MOFs such as Ln-$NH_2$-TPDC and Ln-$NO_2$-TPDC, wherein Ln represents Yb or Nd. The Ln-based materials also include MOFs such as Ln-$NH_2$-BDC and Ln-2$NH_2$-BDC, wherein Ln represents Tb. The Ln-based materials also include metal salts such as $LnX_3$, wherein Ln represents $Ln^{3+}$ cations and X represents an anion. In certain embodiments, $Ln^{3+}$ represents $Yb^{3+}$ or $Nd^{3+}$, and X represents Cl. Furthermore, the metal salts are used to form solutions such as $YbCl_3.6H_2O$ and $NdCl_3.6H_2O$.

In accordance with the invention, Ln-based MOFs are synthesized by reacting a solution of 3,3"-diamino-1,1':4',1"-terphenyl-4,4"-dicarboxylic acid ($H_2$—$NH_2$-TPDC) or a solution of 2"-nitro-1,1':4',1"-terphenyl-4,4"-dicarboxylic acid ($H_2$—$NO_2$-TPDC), and a solution of $LnX_3.6H_2O$ with an acid, such as, 2,6-difluorobenzoic acid in solvent. In certain embodiments, the Ln materials Ln-$NH_2$TPDC and Ln-$NO_2$TPDC of the invention are prepared by reacting a dimethylformamide (DMF) solution of 3,3"-diamino-1,1':4',1"-terphenyl-4,4"-dicarboxylic acid ($H_2$—$NH_2$-TPDC) (e.g., 1.5 mL, 0.05 M) or a DMF solution of 2"-nitro-1,1':4'1"-terphenyl-4,4"-dicarboxylic acid ($H_2$—$NO_2$-TPDC) (e.g., 1.5 mL, 0.05 M), and a DMF solution of $LnCl_3.6H_2O$ (e.g., 0.75 mL, 0.05 M) with an acid, such as, 2,6-difluorobenzoic acid in DMF (e.g., 0.75 mL, 1 M), water, such as, nanopure $H_2O$ (e.g., 0.15 mL) and solvent, such as, concentrated hydrochloric acid/DMF (0.2 mL), in a capped vial placed in an isothermal oven (e.g., 120° C.) for a period of time (e.g., about 14 hours). The vial is then removed from the oven and cooled down naturally to room temperature. Ln-$NH_2$-TPDC crystals or Ln-$NO_2$-TPDC crystals, respectively, are collected after centrifugation and washed with fresh solvent, e.g., DMF (e.g., 3 times using 2 mL each time).

The Ln-based materials are prepared for sensing the organic compound (analyte) by preparing a slurry containing the synthesized Ln-based material and solvent, and grinding with a mortar and pestle to reduce the size of the Ln-based crystals. The presence of a solvent contributes to the Ln-based material retaining crystallinity during the grinding processing. The ground sample is then solvent exchanged, in a vial in accordance with conventional apparatus and techniques. In certain embodiments, the Ln-based MOF materials Ln-$NH_2$TPDC or Ln-$NO_2$TPDC are prepared for sensing the organic compound (analyte) by preparing a slurry containing the synthesized Ln-$NH_2$-TPDC (e.g., approx. 45 mg) or Ln-$NO_2$TPDC (e.g., approx. 45 mg), and solvent, such as DMF, (e.g., 0.5 mL), and grinding with a mortar and pestle (e.g., for 20 min) to reduce the size of the Ln-$NH_2$-TPDC crystals or Ln-$NO_2$-TPDC crystals. The presence of a solvent contributes to the Ln-$NH_2$-TPDC or Ln-$NO_2$-TPDC retaining crystallinity during the grinding processing. The ground sample is then solvent exchanged, e.g., with dichloromethane and n-pentane, in a vial in accordance with conventional apparatus and techniques. For example, to perform solvent exchange, the vial is loaded in a centrifuge tube as secondary container and centrifuged (e.g., at 3000 rpm for 3 min) to form a sample pellet at the bottom the vial. Most of supernatant is removed, with enough solvent remaining to ensure the MOF sample is submerged. The vial is replenished with fresh solvent, and the MOF sample is re-dispersed (e.g., via vortexing). The solvent exchange procedure is typically performed multiple times. In certain embodiments, the solvent exchange is performed every 20 min, with dichloromethane (4 mL each time) for five times and then n-pentane (4 mL each time) for five times. Following the last solvent exchange cycle, the solvent is removed, followed by drying. The Ln-$NH_2$-TPDC or Ln-$NO_2$-TPDC is then ready for use as a "turn on" sensor to sense and detect the organic compounds.

For sensing or detecting, a dispersion of an Ln-based material (e.g., MOF suspension or $LnX_3$/Ln complex solution) is prepared and a solution of an organic compound (analyte) is prepared. The Ln-based material dispersion and the organic compound solution are combined to form a mixture, wherein the luminescence of the mixture is indicative of the organic compound interacting with the lanthanide compound. In certain embodiments, the Ln-based material Ln-$NH_2$-TPDC or Ln-$NO_2$-TPDC is prepared. The Ln-$NH_2$-TPDC (e.g., 2.5 mg) or Ln-$NO_2$-TPDC (e.g., 2.5 mg) is dispersed with acetone (e.g., 2 mL). A solution of the organic compound is prepared, for example, organic compound/acetone solution, and added to the MOF suspension to form a mixture. Emission spectra of the mixture is then conducted. In certain embodiments, the emission spectra is obtained using 485 nm excitation wavelength.

In certain embodiments, a solution of an Ln-based material is prepared by dissolving a commercially available Ln salt in a solvent, and a solution of an organic compound (analyte) is prepared by dissolving the organic compound in a solvent. The Ln salt solution and the organic compound solution are combined to form a mixture, wherein the luminescence of the mixture is indicative of the organic compound interacting with the Ln salt. In certain embodiments, $YbCl_3.6H_2O$ (e.g., 2 mg) or $NdCl_3.6H_2O$ (e.g., 2 mg) is dissolved with DMF (e.g., 2 mL). A solution of the organic compound is prepared, for example, organic compound/acetone solution, and added to the Ln salt solution to form a mixture. Emission spectra of the mixture is then conducted. In certain embodiments, the emission spectra are obtained using 400 nm excitation wavelength.

The amount or concentration of organic compound (analyte) added to the Ln sensor varies. In certain embodiments, the sensitivity of the sensor depends on the amount or concentration of the organic compound (analyte). In certain embodiments, the concentration of organic compound in a sensor solution is from 0.5 to 100 μg/mL. High sensitivity of the sensor solution (e.g, $YbCl_3.6H_2O$ or $NdCl_3.6H_2O$) is achieved when the concentration of organic compound (analyte) in the sensor solution is from 0.5 to 10 μg/mL.

In certain embodiments, the lanthanide-based "turn-on" sensor includes $Yb^{3+}$ or $Nd^{3+}$ photoluminescence of a ytterbium (Yb) or neodymium (Nd) MOF, Yb—$NH_2$TPDC or Nd—$NH_2$TPDC, or Yb or Nd salt ($YbCl_3.6H_2O$ or $NdCl_3.6H_2O$), that selectively detects an organic compound (analyte), such as, but not limited to, gossypol (e.g., with a limit of detection of 25 μg/mL) via a "turn-on" response from a completely non-emissive state in the absence of the organic compound (analyte), e.g., gossypol. A variety of background substances that are present in practical samples of gossypol, such as refined cotton-seed oil, palmitic acid, linoleic acid and α-tocopherol, do not interfere with the $Yb^{3+}$ or $Nd^{3+}$ photoluminescence signal. Further, the "turn-on" of Yb—$NH_2$TPDC or Nd—$NH_2$TPDC photoluminescence is due to the "antenna" effect of gossypol and therefore, gossypol effectively sensitizes $Yb^{3+}$ or $Nd^{3+}$ photoluminescence. This sensing mechanism provides a facile, highly sensitive, fast-response detection of gossypol using $YbCl_3.6H_2O$ or $NdCl_3.6H_2O$ solutions.

Two salient features of gossypol make it an effective antenna molecule for sensitizing $Ln^{3+}$ photoluminescence (PL): (i) gossypol is a yellow pigment with strong absorption of visible light, while most organic linkers can only effectively absorb UV light; and (ii) the multiple hydroxyl substituents and aldehyde groups of the two naphthalene cores of gossypol are potential polydentate binding sites for $Ln^{3+}$. Furthermore, aromatic aldehyde groups, like those in gossypol, react with aromatic amine-functionalized MOF linkers to form Schiff base and effectively red-shift the sensitization wavelengths of the integral antenna in Ln materials. These two scenarios allow for the sensitization of $Ln^{3+}$ PL at longer wavelengths in the presence of gossypol.

In certain embodiments of the invention, a MOF analogue of a $Ln^{3+}$ fcu MOF platform using 3,3"-diamino-1,1':4',1"-terphenyl-4,4"-dicarboxylic acid ($H_2$—$NH_2$TPDC) and $YbCl_3.6H_2O$, denoted as Yb—$NH_2$TPDC, is synthesized. The $Yb^{3+}$ centered near infrared (NIR) emission is advantageous for molecular sensing, as it avoids overlapping with sample fluorescence in the visible spectrum. The Yb—$NH_2$TPDC with fcu topology has a crystal structure (as confirmed by single crystal X-ray diffraction).

In certain embodiments, the Ln-based materials (e.g., Ln-$NH_2$BDC and Ln-$2NH_2$BDC), e.g., terbium-based materials, are used for sensing PAHs, e.g., OH-Py carcinogenic PAHs biomarkers, in a urine specimen or sample derived from a human, e.g., patient. Amino and diamino functionalized MOFs are prepared by reacting 2-amino-1,4-benzenedicarboxylic acid ($H_2$—$NH_2$-BDC) or 2,5-diamino-1,4-benzenedicarboxylic acid ($H_2$-$2NH_2$-BDC) with $TbCl_3.6H_2O$. For example, the reaction is conducted in a mixture of solvent, such as, dimethylformamide (DMF), water and nitric acid solution at 120° C. to yield cubic crystals denoted as $\{[(Me_2NH_2)_2[Tb_6(C_8H_5NO_2)_6.6H_2O]\cdot 12DMF\}_n$(Tb—$NH_2$-BDC) or $\{[(Me_2NH_2)_2[Tb_6(C_8H_6N_2O_2)_6.6H_2O]\cdot 10DMF\}_n$ Tb-$2NH_2$-BDC, respectively.

The "turn-on" sensing ability of activated Tb—$NH_2$-BDC and Tb-$2NH_2$-BDC towards OH-Py shows a fast response of OH-Py in presence of both MOFs. Selective fluorescence "turn-on" of activated Tb—$NH_2$-BDC and Tb-$2NH_2$-BDC towards other urine components such as uric acid, hippuric acid (Hipp), creatine, creatinine, urea, glucose, $NH_4Cl$, NaCl and KCl under the same condition show that both MOFs exhibit highly selective turn-on response towards OH-Py, whereas negligible to moderate response for other urine components under the same conditions. This is because the other urine analytes cannot absorb visible light or modulate the absorption of Tb—$NH_2$-BDC and Tb-$2NH_2$-BDC. Therefore, the other interfering urine components cannot excite under 375 nm and are missing the spectral overlap. Thus, both Tb—$NH_2$-BDC and Tb-$2NH_2$-BDC are efficient "turn-on" sensors for OH-Py.

In accordance with the invention, $H_2$—$NH_2$-TPDC solution is reacted with $LnCl_3.6H_2O$ to form sensing material Ln-$NH_2$-TPDC, wherein Ln represents a lanthanide element or Ln represents ytterbium or neodymium; $H_2$—$NO_2$-TPDC solution is reacted with $LnCl_3$-$6H_2O$ to form sensing material Ln-$NO_2$-TPDC, wherein Ln represents a lanthanide element, or Ln represents ytterbium or neodymium; $H_2$—$NH_2$-BDC solution is reacted with $LnCl_3.6H_2O$ to form sensing material Ln-$NH_2$-BDC, wherein Ln represents a lanthanide element or Ln represents terbium; and $H_2$-$2NH_2$-BDC solution is reacted with $LnCl_3.6H_2O$, to form sensing material Ln-$2NH_2$-BDC, wherein Ln represents a lanthanide element or Ln represents terbium.

In accordance with the invention, the Ln-based turn-on sensors are used to selectively sense or detect an organic compound (analyte). In certain embodiments, a sample or specimen, e.g., solid, solution or suspension, is provided that potentially contains the organic compound. The Ln-based turn-on sensor is utilized to determine whether the sample or specimen contains the organic compound, e.g., gossypol or polycyclic aromatic hydrocarbon. The Ln-based material of the invention is prepared and placed in contact, or interacted, with the sample or specimen. Since the Ln-based material luminesces in the presence of the organic compound and does not luminesce in the absence of the organic compound, the sample or specimen is assessed for luminescence. The presence of luminescence is indicative of the presence of the organic compound in the sample or specimen, and the absence of luminescence is indicative of an absence of the organic analyte in the sample or specimen.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

In the following examples, all purchased chemicals were used without further purification except where otherwise noted. Refined cottonseed oil, gossypol, palmitic acid, linoleic acid, α-tocopherol were purchased from Sigma-Aldrich. Nanopure water (18.1 MΩ) was obtained from a Barnstead Diamond™ water purification system. X-ray powder diffraction patterns were collected using a Bruker AXS D8 Discover powder diffractometer at 40 kV, 40 mA for Cu Kα, (λ=1.5406 Å) from 3 to 45° at a step size of 0.02°. The data were analyzed using the EVA program from the Bruker Powder Analysis Software package. The simulated powder patterns were calculated using Mercury 3.8 and CIF files. Single crystal X-ray diffraction experiments were performed on a Bruker X8 Prospector Ultra diffractometer equipped with an Apex II CCD detector and an IμS micro-focus Cu Kα X-ray source (λ=1.54178 Å). Data were collected at 230 K under $N_2$ flow and processed using the Bruker APEX II software package and refined with Olex2 program. $^1H$ NMR spectra were collected using Bruker Avance III 300 MHz spectrometers. Chemical shifts are in parts per million (ppm) using the residual solvent peak (DMSO-$d_6$) as references. Thermogravimetric analyses (TGA) were performed using a TGA Q500 thermal analysis system under a $N_2$ atmosphere from room temperature to 650° C. at a ramping rate of 5° C./min. Solution UV—Vis absorption spectra were collected using an Agilent 8453 UV—Vis spectrometer equipped with deuterium and tungsten lamps. Photoluminescence measurements were collected using a Horiba Jobin-Yvon NanoLog spectrofluorometer with a 450 W xenon source, double excitation monochromators, and a Symphony II InGaAs array detector. Excitation gratings were blazed at 330 nm with 1200 grooves/mm and emission gratings blazed at 780 nm with 100 grooves/mm. All measurements were obtained with an 830 nm long-pass filter at ambient temperature.

Example 1

Synthesis of Yb—$NH_2$TPDC[$Yb_6(OH)_8(C_{20}H_{14}N_2O_4)_6(H_2O)_6$]·2($C_2H_8N$)·17DMF·6$H_2O$ Stock solutions of $H_2$—$NH_2$-TPDC (0.05 M) and $YbCl_3\cdot6H_2O$ (0.05 M) and 2,6-difluorobenzoic acid (1 M) in DMF were prepared. A mixture of concentrated hydrochloric acid/DMF (1/2.3 v/v) was prepared. To a 20 mL Pyrex vial was added $H_2$—$NH_2$-TPDC solution (1.5 mL, 0.05 M), $YbCl_3\cdot6H_2O$ (0.75 mL, 0.05 M), 2,6-difluorobenzoic acid (0.75 mL, 1 M), nanopure $H_2O$ (0.15 mL) and concentrated hydrochloric acid/DMF (0.2 mL) sequentially. The vial was tightly capped and heated in a 120° C. isothermal oven for 14 hours. The vial was then removed from oven and cooled down naturally to room temperature. Crystals were collected after centrifugation and washed with fresh DMF (3×, 2 mL each time). Yield: 15 mg. Anal. calcd. (%): C, 43.76; H, 5.27; N, 9.04; Found (%): C, 43.09; H, 4.68; N, 9.32.

The experimental PXRD pattern of as-synthesized Yb—$NH_2$-TPDC and the simulated PXRD pattern of Yb—$NH_2$-TPDC based on its crystal structure were produced. The experimental power X-ray diffraction (PXRD) pattern of the Yb—$NH_2$TPDC bulk sample closely matched the simulated PXRD pattern of Yb—$NH_2$TPDC, indicating high phase purity.

$^1H$ NMR of Digested Yb—$NH_2$-TPDC Sample

Approximately 3 mg of the as-synthesized Yb—$NH_2$-TPDC was dried under argon flow and then dissolved with ~500 μL of DMSO-$d_6$ and 30 μL of DCl/$D_2O$. An $^1H$ NMR spectrum was collected on the sample solution, which showed two singlets at 2.48 ppm, and 8.15 ppm corresponding to protons from $(CH_3)_2NH^{2+}$.

Sample Activation and $N_2$ Gas Adsorption Experiment of Yb—$NH_2$TPDC

Two batches of as-synthesized Yb—$NH_2$TPDC were prepared (vide supra) and combined in a 20 mL Pyrex vial after being thoroughly washed with DMF. Solvent exchange was performed with dichloromethane and then n-pentane. To perform solvent exchange, most of existing solvent in the sample vial was removed using a glass pipette with enough solvent remaining to submerge the MOF sample. The vial was then replenished with fresh solvent. This solvent exchange procedure was performed every 20 min, with dichloromethane (6 mL each time) for the first 5 cycles and then n-pentane (12 mL each time) for another 5 cycles. After the last solvent exchange cycle with n-pentane, the solvent was removed by pipetting followed by drying under argon flow. The MOF sample was then evacuated on a Micromeritics Smart VacPrep at room temperature for 21 hours to obtain 29.4 mg of activated sample. $N_2$ isotherm of MOF samples were collected at 77K on a Micromeritics 3Flex instrument.

Yb—$NH_2$TPDC was successfully activated under vacuum at room temperature without losing crystallinity after stepwise solvent exchange with dichloromethane and n-pentane. $N_2$ adsorption analysis of activated Yb—$NH_2$TPDC at 77K yielded a type I isotherm with a Brunauer-Emmett-Teller (BET) surface area of 2370 m2/g.

Excitation-Emission Maps of Yb—$NH_2$-TPDC Samples

Excitation-emission maps of Yb—$NH_2$-TPDC samples with and without gossypol were measured using an integration sphere on solid MOF samples stored under acetone in quartz capillary tubes. The excitation wavelength was scanned from 300 to 700 nm in 5 nm increments, and the emission was detected between 820 to 1580 nm with 1.5 nm increments. Slit widths were set at 10 nm for both excitation and emission. An integration time of 10 s was used for each emission spectrum.

The Yb—$NH_2$-TPDC samples were prepared using the following procedure. Two samples each containing 2.5 mg of activated Yb—$NH_2$-TPDC were incubated, respectively, with acetone (1 mL) and gossypol/acetone solution (0.1 mg/mL, 1 mL) in 1.5 mL centrifuge tubes at 20° C. for 44 hours using a thermal mixer at 1000 rpm. After the incubation time, the MOF crystals were centrifuged and transferred to custom-made quartz tubes with 0.5 mL of the incubation solvent or solution. The quartz tubes were sealed with parafilm to prevent solvent evaporation.

Sensing Experiments Using Yb—$NH_2$-TPDC

A slurry containing three batches of as-synthesized Yb—$NH_2$-TPDC (approx. 45 mg) and 0.5 mL of DMF was ground with a mortar and pestle for 20 min to reduce the size of Yb—$NH_2$-TPDC crystals. Grinding without DMF will cause Yb—$NH_2$-TPDC to lose crystallinity. The ground sample was then solvent exchanged with dichloromethane and n-pentane in a 5 mL sample vial. To perform solvent exchange, the sample vial was loaded in a 50 mL centrifuge tube as secondary container and centrifuged at 3000 rpm for 3 min to form a sample pellet at the bottom the vial. Most of supernatant was removed using a glass pipette with enough solvent left to ensure the MOF sample was submerged. After the vial was replenished with fresh solvent, MOF sample was re-dispersed via vortexing. This solvent exchange procedure was performed every 20 min, with dichloromethane (4 mL each time) for 5 times and then n-pentane (4 mL each time) for 5 times. After the last solvent exchange cycle with n-pentane, the solvent was removed by pipetting followed by drying under argon flow. After evacuating under Schlenk vacuum for 1 hour, the Yb—$NH_2$-TPDC sample was ready for sensing experiments.

For gossypol sensing experiments, 2.5 mg of Yb—$NH_2$-TPDC was dispersed with 2 mL of acetone in a standard fluorescence macro cuvette equipped with a PTFE stopper (Fireflysci type 21 macro cuvette, light path: 10 mm×10 mm). Approx. 1 mL of gossypol/acetone solution (0 μg/mL, 25 μg/mL, 50 μg/mL, 75 μg/mL, 100 μg/mL) was then added to the MOF suspension. The cuvette was tightly capped, mounted on top of a thermomixer (Eppendorf Thermomixer R Mixer) using a custom-made sample holder and incubated at room temperature with 500 rpm mixing frequency. Emission spectra of each sample was followed over 300 min. The cuvette was vigorously shaken with hand and emission spectra were immediately collected. The emission spectra were obtained using 485 nm excitation wavelength. The emission was detected between 820 to 1580 nm with 1.5 nm increments. Slit widths were set at 10 nm for both excitation and emission. An integration time of 1 s was used for each emission spectrum.

For gossypol sensing interference experiments, 1 mL of 2.5 mg/mL Yb—$NH_2$-TPDC in acetone was mixed with 1 mL of acetone (blank) or gossypol/acetone solution (100 μg/mL) and 1 mL of interferant acetone solution, including: cotton-seed oil (100 mg/mL), palmitic acid (1 mg/mL), linoleic acid (1 mg/mL) and α-tocopherol (1 mg/mL). The mixture was incubated on top of a thermomixer (Eppendorf Thermomixer R Mixer) in a 15 mL centrifuge tube at room temperature for 300 min with 500 rpm mixing frequency and then transferred to a standard fluorescence macro cuvette equipped with a PTFE stopper (Fireflysci type 21 macro cuvette, light path: 10 mm×10 mm). The cuvette was vigorously shaken with hand and emission spectra were immediately collected. The emission spectra were obtained using 485 nm excitation wavelength. The emission was detected between 820 to 1580 nm with 1.5 nm increments. Slit widths were set at 10 nm for both excitation and emission. An integration time of 1 s was used for each emission spectrum.

Synthesis of Yb—$NO_2$TPDC

Stock solutions of $H_2$—$NO_2$-TPDC (0.05 M) and $YbCl_3 \cdot 6H_2O$ (0.05 M) and 2,6-difluorobenzoic acid (1 M) in DMF were prepared. To a 4 mL Pyrex vial equipped with a PTFE cap was added $H_2$—$NO_2$TPDC solution (0.3 mL, 0.05 M), $YbCl_3 \cdot 6H_2O$ (0.15 mL, 0.05 M), 2,6-difluorobenzoic acid (0.25 mL, 1 M) sequentially. The vial was tightly capped and heated in a 100° C. isothermal oven for 40 hours. The vial was then removed from oven and cooled down naturally to room temperature. Crystals were collected after centrifugation and washed with fresh DMF (3×, 1 mL each time). Yield: 2.3 mg.

The experimental PXRD pattern of as-synthesized Yb—$NO_2$-TPDC and the simulated PXRD pattern of Yb—$NH_2$-TPDC based on its crystal structure were produced. The close match between the two PXRD patterns indicates Yb—$NO_2$-TPDC is an isoreticular analogue of Yb—$NH_2$-TPDC.

Excitation-Emission Maps of Yb—$NO_2$-TPDC Samples

Excitation-Emission maps of Yb—$NO_2$-TPDC samples with and without gossypol were measured using an integration sphere on solid MOF samples stored under acetone in quartz capillary tubes. The excitation wavelength was scanned from 300 to 700 nm in 5 nm increments, and the emission was detected between 820 to 1580 nm with 1.5 nm increments. Slit widths were set at 10 nm for both excitation and emission. An integration time of 10 s was used for each emission spectrum.

The Yb—$NO_2$-TPDC samples were prepared using the procedure as follows. Two samples containing 6 mg of as-synthesized Yb—$NO_2$-TPDC were first washed with acetone (4 times, 1 mL each time), and then incubated respectively with acetone (1 mL) and gossypol/acetone solution (0.1 mg/mL, 1 mL) in 1.5 mL centrifuge tubes at 20° C. for 44 hours using a thermomixer (Eppendorf Thermomixer R Mixer) with 1000 rpm mixing frequency. After the incubation time, the MOF crystals were centrifuged and transferred to quartz tubes with 0.5 mL of the incubation solvent or solution. The quartz tubes were sealed with parafilm to prevent solvent evaporation. Excitation-Emission maps were collected when all of the MOF crystals settled to the bottom of the quartz tubes.

Liquid Chromatography-Mass Spectrometry (LC-MS) Experiments

Yb—$NH_2$-TPDC (5.7 mg) was incubated in gossypol/acetone solution (0.1 mg/mL, 2 mL) at 20° C. for 44 h on a thermomixer (Eppendorf Thermomixer R Mixer) at room temperature with 500 rpm mixing frequency. After incubation, the MOF crystals were washed with ethanol (3 times, 3 mL each time). To the washed MOF crystals were then added NaBH4/EtOH solution (10 mg/mL, 3 mL) in a Pyrex vial. The mixture was allowed to react at room temperature for 18 hrs. The solid in the mixture was separated via centrifugation and then washed with fresh EtOH (3 times, 1 mL each time). To the solid was then added aqueous HCl solution (1 M, 1 mL). After sonicating for 5 min, the mixture was centrifuged, and supernatant removed. The precipitate was then dissolved in MeOH (1 mL). The solution was then submitted to LC-MS.

In ESI+ mode, the [M+H]+ peak for $NH_2$-TPDC linker (m/z=349) was observed along with additional peaks. However, no peaks corresponding to the two possible reduced Schiff base products were identified.

Yb—$NH_2$-TPDC MOF (2.5 mg) was incubated with gossypol acetone solution (0.1 mg/mL, 1 mL) at room temperature for 42 hrs. The supernatant was collected and examined with LC-MS using ESI− mode. Mass spectrometry data indicate that gossypol molecules in solution were intact after incubation with MOF in acetone for 42 hours.

Mass spectrum (ESI−) of gossypol solution after incubating with MOF Yb—$NH_2$-TPDC showed the three peaks with m/z=517, m/z=557, m/z=597 corresponding, respectively, to [M–H]—, [$M^+$acetone-$H_2O$—H]— and [$M^{+2}$(acetone-$H_2O$)—H]—.

Excitation-Emission Map of $YbCl_3 \cdot 6H_2O$ Sample in the Presence of Gossypol Excitation-Emission maps of $YbCl_3$ in the presence of gossypol were measured on a solution sample in a macro cuvette. The excitation wavelength was scanned from 300 to 700 nm in 10 nm increments, and the emission was detected between 820 to 1580 nm with 1.5 nm increments. Slit widths were set at 10 nm for both excitation and emission. An integration time of 1 s was used for each emission spectrum.

The sample was prepared using the following procedure. The $YbCl_3 \cdot 6H_2O$ (2.3 mg) was dissolved in DMF (2 mL) in a standard fluorescence macro cuvette equipped with a PTFE stopper (Fireflysci type 21 macro cuvette, light path: 10 mm×10 mm). Gossypol/acetone solution (0.005 mg/mL, 1 mL) was added to the cuvette. The mixture was incubated at room temperature for 5 minutes before excitation-emission map was collected.

Gossypol Sensing Experiments Using $YbCl_3$

A stock solution of 1 mg/mL $YbCl_3 \cdot 6H_2O$ in DMF was prepared by dissolving $YbCl_3 \cdot 6H_2O$ (30.7 mg) in DMF (30.7 mL) in a 40 mL Pyrex vial. In each sensing experiment, 2 mL of the $YbCl_3 \cdot 6H_2O$ solution (1 mg/mL) was added in a standard fluorescence macro cuvette equipped with a PTFE stopper (Fireflysci type 21 macro cuvette, light path: 10 mm×10 mm). 1 mL of gossypol/acetone solution (0 μg/mL, 0.5 μg/mL, 1 μg/mL, 3 μg/mL, 5 μg/mL, 7 μg/mL, 10 μg/mL, 25 μg/mL, 50 μg/mL) was then added to the cuvette. The cuvette was capped and incubated at room temperature for 5 min on top of a thermomixer (Eppendorf Thermomixer R Mixer) with 500 rpm mixing frequency before emission spectra were collected. The emission spectra were obtained using 400 nm excitation wavelength. The emission was detected between 820 to 1580 nm with 1.5 nm increments. Slit widths were set at 10 nm for both excitation and emission. An integration time of 1 s was used for each emission spectrum.

Emission intensities at 976 nm of $YbCl_3$ solution in the presence of various gossypol concentrations were determined. The sensor solution had the highest sensitivity when gossypol concentration was between 0.5 and 10 μg/mL. To quantify gossypol concentrations between 0.5 and 10 μg/mL, a linear calibration curve was sufficient; emission intensities of $YbCl_3$ solution and gossypol concentrations in the range of 0.5-50 μg/mL were fit by an exponential curve.

Gossypol Sensing Experiments Using $NdCl_3$

A stock solution of 1 mg/mL $NdCl_3 \cdot 6H_2O$ in DMF was prepared by dissolving $NdCl_3 \cdot 6H_2O$ (23.1 mg) in DMF (23.1 mL) in a 40 mL Pyrex vial. In each sensing experiment, 2 mL of the $NdCl_3 \cdot 6H_2O$ solution (1 mg/mL) was added in a standard fluorescence macro cuvette equipped with a PTFE stopper (Fireflysci type 21 macro cuvette, light path: 10 mm×10 mm). 1 mL of gossypol/acetone solution (0 μg/mL, 1 μg/mL, 3 μg/mL, 5 μg/mL, 7 μg/mL, 10 μg/mL, 25 μg/mL, 50 μg/mL, 75 μg/mL, 100 μg/mL) was then added to the cuvette. The cuvette was capped and incubated at room temperature for 5 min on top of a thermomixer at 500 rpm before emission spectra were collected. The cuvette was capped and incubated at room temperature for 5 min on top of a thermomixer (Eppendorf Thermomixer R Mixer) with 500 rpm mixing frequency before emission spectra were collected. The emission spectra were obtained using 400 nm excitation wavelength. The emission was detected between 820 to 1580 nm with 1.5 nm increments. Slit widths were set at 10 nm for both excitation and emission. An integration time of 1 s was used for each emission spectrum.

Emission intensities at 1056 nm of $NdCl_3$ solution in the presence of various gossypol concentrations were determined. The sensor solution had the highest sensitivity when gossypol concentration was between 0.5 and 10 μg/mL. To quantify gossypol concentrations between 0.5 and 10 μg/mL, a linear calibration curve was sufficient; emission intensities of $YbCl_3$ solution and gossypol in the range of 0.5-100 μg/mL were fit by an exponential curve.

Discussion

The MOF analogue of the well-established $Ln^{3+}$ fcu MOF platform was synthesized using 3,3"-diamino-1,1':4',1"-terphenyl-4,4"-dicarboxylic acid ($H_2$—$NH_2$-TPDC) and $YbCl_3 \cdot 6H_2O$, denoted as Yb—$NH_2$-TPDC. The $Yb^{3+}$-centered near infrared (NIR) emission is advantageous for molecular sensing, as it does not overlap with sample fluorescence in the visible spectrum. The anticipated crystal structure of Yb—$NH_2$-TPDC with fcu topology was confirmed by single crystal X-ray diffraction data. The experimental powder X-ray diffraction (PXRD) pattern of the bulk sample closely matched the simulated PXRD pattern of Yb—$NH_2$-TPDC, indicating high phase purity. The $[Yb_6(OH)_8(COO)_{12}]^{2-}$ secondary building units (SBUs) make Yb—$NH_2$-TPDC a negatively charged framework. The charge balancing cation, dimethylammonium, was observed from $^1H$ NMR of the digested sample. With equilateral triangular pore apertures that measure 13.5 Å in altitude, when accounting for Van der Waals radii, Yb—$NH_2$-TPDC should allow entry of gossypol, which measures approximately 10.4 Å×10.7 Å×16.9 Å. A coordinating oxygen atom, likely either from a water or dimethyl formamide (DMF) molecule, was observed near each $Yb^{3+}$ ion of the BU, indicating a possible coordination site for gossypol molecules. Thermogravimetric analysis showed a steep weight loss below 120° C. corresponding to evaporation of solvent guests and a more gradual weight loss after 120° C. The lack of a well-defined plateau signifies poor thermal stability above 120° C. Yb—$NH_2$-TPDC was successfully activated under vacuum at room temperature without losing crystallinity after stepwise solvent exchange with dichloromethane and n-pentane. The $N_2$ adsorption analysis at 77K of activated sample yielded a type I isotherm from which the Brunauer-Emmett-Teller (BET) surface area of 2370 $m^2/g$ was determined.

In the absence of gossypol, a solid Yb—$NH_2$-TPDC sample under acetone, when excited between 300-475 nm, exhibited the characteristic $Yb^{3+}$ NIR emission band at 940-1060 nm corresponding to $^2F_{5/2} \rightarrow {}^2F_{7/2}$ transition of $Yb^{3+}$. Since $Yb^{3+}$ does not have electronic levels that can be excited with ultraviolet or visible light, the $Yb^{3+}$ PL of Yb—$NH_2$-TPDC must be due to the "antenna effect" of the $NH_2$-TPDC linker. Notably, the excitation band of Yb—$NH_2$-TPDC (300-475 nm) was red-shifted in comparison to the UV-vis absorption spectrum of $H_2$—$NH_2$-TPDC in solution, which showed two bands centered at 300 nm and 360 nm and no significant absorption at wavelengths above 410 nm. Similar effects were observed in a different MOF. This large discrepancy may be due to confinement effects, where the MOF architecture forces molecules to adopt different conformations than those in solution. Intriguingly, incubating Yb—$NH_2$-TPDC with gossypol led to a red-shift of the long wavelength edge of the excitation band of $Yb^{3+}$ PL from 475 nm as observed in the blank sample to 550 nm. Compared to the blank sample, a decrease in $Yb^{3+}$ PL intensity in the presence of gossypol was also noted when Yb—$NH_2$-TPDC was excited between 340 and 400 nm. This was ascribed to the attenuation of incident light caused by the strong light absorption of gossypol in solution in this range. These results indicate that under excitation between 475 nm and 550 nm, the $Yb^{3+}$ PL of Yb—$NH_2$-TPDC can be switched on from a complete non-emissive state in response to the presence of gossypol.

The kinetics of $Yb^{3+}$ PL of Yb—$NH_2$-TPDC in response to gossypol was then evaluated. Specifically, 1 mL of gossypol/acetone solution (25 μg/mL, 50 μg/mL, 75 μg/mL, 100 μg/mL) was added to 2 mL of acetone suspension containing 2.5 mg of Yb—$NH_2$-TPDC powder in a standard macro fluorescence cuvette. $Yb^{3+}$ PL was immediately monitored for 300 min under 485 nm excitation light. Upon addition of gossypol, $Yb^{3+}$ emission gradually increased over 300 min. The slow increase of PL intensity was likely due to the hindered diffusion of the bulky gossypol within Yb—$NH_2$-TPDC. With an equal amount of incubation time, stronger $Yb^{3+}$ PL intensity correlates with higher gossypol concentration in the 25-100 μg/mL range. At 300 min, $Yb^{3+}$ PL intensity follows a linear dependence with gossypol concentration between 25 μg/mL and 100 μg/mL, and therefore is suitable for quantification of gossypol in this concentration range. No appreciable $Yb^{3+}$ emission was observed in the absence of gossypol. The limit of detection was determined to be 25 μg/mL (~32 ppm in acetone solution) with a S/N of 7. No reliable $Yb^{3+}$ emission was detected when solutions of lower concentrations were tested. The actual minimum detectable gossypol concentration was 8.3 μg/mL (~11 ppm in acetone solution), because the 1 mL of 25 μg/mL gossypol solution was diluted into 3 mL in cuvette. Despite the relatively slow response, Yb—$NH_2$-TPDC is an effective sensor for practical detection and quantification of gossypol in terms of its limit of detection.

Interference from background molecules present in realistic samples, such as cottonseed oil and cotton meals, may hamper gossypol detection and quantification. To evaluate the selectivity of Yb—$NH_2$-TPDC as a sensor for gossypol, it was further evaluated whether $Yb^{3+}$ PL excited at 485 nm can be turned on by substances commonly present in the context of gossypol detection.

Refined cottonseed oil solution (100 mg/mL), palmitic acid solution (1 mg/mL), linoleic acid solution (1 mg/mL), and α-tocopherol solution (1 mg/mL) did not induce $Yb^{3+}$ PL. Presumably, $Yb^{3+}$ PL cannot be sensitized by these substances because they do not absorb visible light or they cannot modulate the absorption of $NH_2$-TPDC linkers. Apart from producing interfering signals, interferants could also block the interactions between the target analyte and sensor. For instance, background molecules could adsorb to Yb—$NH_2$-TPDC more favorably than gossypol and prevent gossypol from switching on $Yb^{3+}$ luminescence. To assess the gossypol detection performance of Yb—$NH_2$-TPDC in the presence of background substances, $Yb^{3+}$ PL intensity at 976 nm in response to gossypol (100 mg/mL) without interferents was compared to PL intensity in the presence of cottonseed oil (100 mg/mL), palmitic acid (1 mg/mL), linoleic acid (1 mg/mL), and α-tocopherol (1 mg/mL), respectively. Although the concentrations of all tested interferents were at least 10 times higher than gossypol, the PL intensities of Yb—$NH_2$-TPDC were largely unaffected. Overall, the $Yb^{3+}$ PL of Yb—$NH_2$-TPDC is selectively turned on by gossypol.

To determine the operative mechanism, Yb—$NO_2$-TPDC was synthesized using 2'-nitro-1,1':4',1"-terphenyl-4,4"-dicarboxylic acid (H2-$NO_2$-TPDC). Yb—$NO_2$-TPDC and Yb—$NH_2$-TPDC are isoreticular, as confirmed by PXRD. Lacking —$NH_2$ groups, Yb—$NO_2$-TPDC cannot react with gossypol to form a Schiff base. In the absence of gossypol, the $NO_2$-TPDC linker does not sensitize $Yb^{3+}$ PL at any excitation wavelengths. Incubating Yb—$NO_2$-TPDC with gossypol solution, however, led to strong $Yb^{3+}$ PL with excitation wavelengths spanning from 350 nm to 600 nm. Significantly, these experiments indicate, that gossypol is an effective sensitizer for $Yb^{3+}$ PL. Further, no sign of Schiff base formation was observed after reacting Yb—$NH_2$-TPDC with gossypol using the previously described method. In conclusion, the "turn-on" response of $Yb^{3+}$ PL at 485 nm excitation is mainly due to the "antenna" effect of gossypol. As "antennae", gossypol can sensitize $Yb^{3+}$ PL of both Yb—$NH_2$-TPDC and Yb—$NO_2$-TPDC at excitation wavelengths greater than 525 nm, while gossypol in solution does not exhibit absorption above 480 nm. The large discrepancy between the gossypol excitation range in the MOF and its absorption band in solution is reminiscent of the above-mentioned observation with $NH_2$-TPDC linker, and may also be attributed to confinement effects.

With strong evidence supporting that gossypol is an effective sensitizer for $Yb^{3+}$ PL, other Ln materials for gossypol detection were evaluated. Since gossypol can form complexes with Ln3+ ions in solution, tests were conducted to determine whether simple and commercially available $Ln^{3+}$ salts can be used as "turn-on" sensors for gossypol. Indeed, $YbCl_3 \cdot 6H_2O$ solution exhibited intense $Yb^{3+}$ PL upon addition of gossypol. The excitation-emission map of an $YbCl_3 \cdot 6H_2O$ solution after 5 min incubation with gossypol showed that $Yb^{3+}$ PL can be observed upon excitation from 330 nm to 480 nm. Compared to Yb—$NH_2$-TPDC, the response time of $YbCl_3 \cdot 6H_2O$ is significantly faster, likely because gossypol molecules can readily access and coordinate $Yb^{3+}$ ions in solution without overcoming the diffusion barriers posed by MOF pores. To determine the detection range of $YbCl_3 \cdot 6H_2O$, emission spectra were collected 5 minutes after 1 mL of gossypol/acetone solution (0 μg/mL, 0.5 mg/mL, 1 μg/mL, 3 μg/mL, 5 μg/mL, 7 μg/mL, 10 μg/mL, 25 μg/mL, 50 μg/mL) was added to 2 mL of $YbCl_3 \cdot 6H_2O$/DMF solution (1 mg/mL). No emission was observed for the sample with acetone blank, while $Yb^{3+}$ emission was observed for all samples containing gossypol. The limit of detection was determined to be 0.5 μg/mL (0·64 ppm) with a S/N of 10. The PL intensity at 976 nm followed a linear dependence with the concentration of gossypol solution between 0.5 μg/mL and 10 μg/mL and approached saturation at higher concentrations. In addition, it was discovered that the $Nd^{3+}$ PL of $NdCl_3 \cdot 6H_2O$ at 1056 nm can also be used for gossypol detection in a similar fashion. Yb—$NH_2$-TPDC and $YbCl_3 \cdot 6H_2O$ are complimentary and allow for detection and quantification of gossypol at different concentration ranges: from 0.5 μg/mL to 10 μg/mL using $YbCl_3 \cdot 6H_2O$, and from 25 to 100 μg/mL using Yb—$NH_2$-TPDC. In addition, Yb—$NH_2$-TPDC can be advantageous for integration into solid state devices, whereas $YbCl_3 \cdot 6H_2O$provides a simple way to rapidly and sensitively detect gossypol in solution.

In summary, it was discovered that gossypol, a toxic molecule that concerns the cotton industry, can effectively sensitize $Yb^{3+}$ and $Nd^{3+}$ NIR PL. As a result, there was demonstrated examples of luminescence "turn-on" detection of gossypol using Ln MOFs and Ln salts and achieved highly selective, fast-responding, and sensitive sensing of gossypol in acetone solution with a concentration of 0.5-100 μg/mL. This general sensing approach is applicable to the detection of a wide variety of aromatic molecules, including pharmaceuticals, pesticides, and other contaminants that may be present in water and food.

Example 2

The "turn-on" sensing of OH-Py carcinogenic PAHs biomarkers by amino and diamino functionalized MOFs was evaluated. The 2-amino-1,4-benzenedicarboxylic acid ($H_2$—$NH_2$-BDC) and 2,5-diamino-1,4-benzenedicarboxylic acid ($H_2$-2$NH_2$-BDC) were reacted with $TbCl_3 \cdot 6H_2O$ in a mixture of dimethylformamide (DMF), water and nitric acid solution at 120° C. and yielded colorless and brown-black cubic crystals denoted as $\{[(Me_2NH_2)_2 \cdot [Tb_6(C_8H_5NO_2)_6 \cdot 6H_2O] \cdot 12DMF\}_n$(Tb—$NH_2$-BDC) and $\{[(Me_2NH_2)_2 \cdot [Tb_6(C_8H_6NO_2)_6 \cdot 6H_2O] \cdot 10DMF\}_n$Tb-2$NH_2$-BDC, respectively. Both MOFs were characterized by numerous analytical techniques.

The emission spectra of activated Tb—$NH_2$-BDC and Tb-2$NH_2$-BDC upon incremental addition of OH-Py resulted in quenching when excited in the range of 280-370 nm. This result depicted the attenuation of incident light due to the photoinduced electron transfer (PET) or Forster resonance energy transfer (FRET) process in the presence of OH-Py. These experiments indicated that after excitation beyond 370 and up to 410 nm the turn-on emission was observed in the presence of OH-Py. The turn-on sensing ability of activated Tb—$NH_2$-BDC and Tb-2$NH_2$-BDC towards OH-Py upon excitation at 375 nm was then evaluated. The typical fluorometric titration of OH-Py (1 mM stock solution; 2.5-300 μL, each) showed turn-on signature at 407 and 408 nm. The detection limit (LoD, 36/m) of activated Tb—$NH_2$-BDC and Tb-2$NH_2$-BDC were found to be 19 and 59 parts per billion (ppb) for OH-Py, respectively. The fast response of OH-Py in presence of both MOFs suggested the diffusion and mass transfer of both analyte in the pore channels.

For real-time applications, selective fluorescence turn-on titration experiment of activated Tb—$NH_2$-BDC and Tb-2$NH_2$-BDC towards other urine components such as uric acid, hippuric acid (Hipp), creatine, creatinine, urea, glucose, $NH_4Cl$, NaCl and KCl under the same condition (λexc: 375 nm, 1 mM stock solution; 10-300 μL each, measured after every one minute), were performed. This fluorescent titration experiment depicted that both MOFs exhibited highly selective turn-on response towards OH-Py, whereas negligible to moderate response observed for other urine components under the same conditions. This was because the rest of the urine analytes cannot absorb visible light or modulate the absorption of Tb—$NH_2$-BDC and Tb-2$NH_2$-BDC. Therefore, except OH-Py other interfering urine components cannot excite under 375 nm and missing the spectral overlap. Both the MOFs exhibited good recyclability after turn-on detection. These results demonstrate that both Tb—$NH_2$-BDC and Tb-2$NH_2$-BDC are an efficient turn-on sensor for OH-Py and for real-time applications.

We claim:

1. A lanthanide-based, turn-on sensor, comprising:

an organic analyte comprising gossypol;

a lanthanide compound configured to luminesce in a presence of the organic analyte and configured to not luminesce in an absence of the organic analyte, wherein the lanthanide-based, turn-on sensor is selected from the group consisting of a solid state, suspension, coating and solution; and wherein the lanthanide compound is selected from the group consisting of Yb-$NH_2$-TPDC, Yb-NO2-TPDC, Nd-$NH_2$-TPDC, Nd-NO2-TPDC, Tb-NH2-BDC and Tb-2NH2-BDC, and YbCl3·6H2O and NdCl3·6H2O.

2. The turn-on sensor of claim 1, wherein the lanthanide compound comprises a chemical element selected from the group consisting of lanthanum, cerium, praseodymium, neodymium, promethium, samarium, europium, gadolinium, terbium, dysprosium, holmium, erbium, thulium, ytterbium, lutetium, and chemically similar elements scandium and yttrium, and combinations thereof.

3. The turn-on sensor of claim 1, wherein the lanthanide-based, turn-on sensor is in a form selected from the group consisting of metal-organic framework (MOF), complex, and simple salt.

4. The turn-on sensor of claim 1, wherein the lanthanide-based, turn-on sensor is in a form of a thin film.

5. The turn-on sensor of claim 1, wherein the lanthanide compound is selected from the group consisting of Ln-NH2-TPDC, Ln-NO2-TPDC, Ln-NH2-BDC and Ln-2NH2-BDC, and LnX3, where Ln represents Ln3+ cations and X represents an anion.

6. A lanthanide-based, turn-on sensor, comprising:

an organic analyte comprising gossypol; and a lanthanide compound configured to luminesce in a presence of the organic analyte and configured to not luminesce in an absence of the organic analyte, the lanthanide compound in a form of a metal-organic framework comprising lanthanide-$NH_2$-TPDC or lanthanide-$NO_2$-TPDC wherein the lanthanide is selected from Yb or Nd, or comprising lanthanide-$NH_2$-BDC or lanthanide-2$NH_2$-BDC wherein the lanthanide is Tb, wherein the lanthanide-based, turn-on sensor is selected from the group consisting of a solid state, suspension, coating and solution.

* * * * *